United States Patent [19]
Arroyo et al.

[11] Patent Number: 5,146,046
[45] Date of Patent: Sep. 8, 1992

[54] CABLE HAVING WATERBLOCKING PROVISIONS BETWEEN LAYERS OF RELATIVELY RIGID AND SUPPLE MATERIALS

[75] Inventors: Candido J. Arroyo, Lithonia; Stanley R. Bogdan, Duluth; David S. Hancock, Roswell, all of Ga.

[73] Assignee: AT&T Bell Laboratories, Murray Hill, N.J.

[21] Appl. No.: 662,054

[22] Filed: Feb. 28, 1991

[51] Int. Cl.$^5$ .......................... H01B 7/18; H01B 7/28
[52] U.S. Cl. ................................................ 174/23 R
[58] Field of Search ................. 174/23 R, 106 R, 107, 174/116

[56] References Cited

U.S. PATENT DOCUMENTS

| | | | |
|---|---|---|---|
| 3,340,353 | 9/1967 | Mildner | 174/106 R |
| 3,376,378 | 4/1968 | Bullock | 174/107 |
| 3,638,306 | 2/1972 | Padowicz | 174/107 |
| 3,812,283 | 5/1974 | Kothe et al. | 174/106 R X |
| 4,563,540 | 1/1986 | Bohannon, Jr. et al. | 174/107 X |
| 4,815,813 | 3/1989 | Arroyo et al. | 174/23 C X |
| 4,867,526 | 9/1989 | Arroyo | 350/96.23 |
| 4,909,592 | 3/1990 | Arroyo et al. | 350/96.23 |
| 4,913,517 | 4/1990 | Arroyo et al. | 174/705 X |
| 4,963,695 | 10/1990 | Marciano-Agostinelli et al. | 174/23 C |

OTHER PUBLICATIONS

"Lanseal-F Super Absorbent Fiber" Bulletin published by Japan Exlan Co., Ltd.
"Waterblocking Yarns" bulletin distributed by GECA-Tapes.

Primary Examiner—Morris H. Nimmo
Attorney, Agent, or Firm—Edward W. Somers

[57] ABSTRACT

A communications cable (20) includes a core (22) comprising a plurality of transmission media having a relatively supple layer (26) of a plastic material wrapped thereabout. Disposed about the layer of plastic material and in engagement therewith is a relatively rigid inner plastic jacket (28). Disposed about the inner jacket are additional components of a sheath system such as metallic shields and one or more additional plastic jackets. Interposed between the relatively supply layer of plastic material and the jacket is a waterblocking system which comprises two elongated strand materials (42,44) such as yarns. The two elongated strand materials are wrapped helically about the layer of plastic material in opposite helical directions. The elongated strand materials are effective to intercept water which may travel along the cable between the relatively supple layer of plastic material and the jacket which is contiguous thereto.

8 Claims, 2 Drawing Sheets

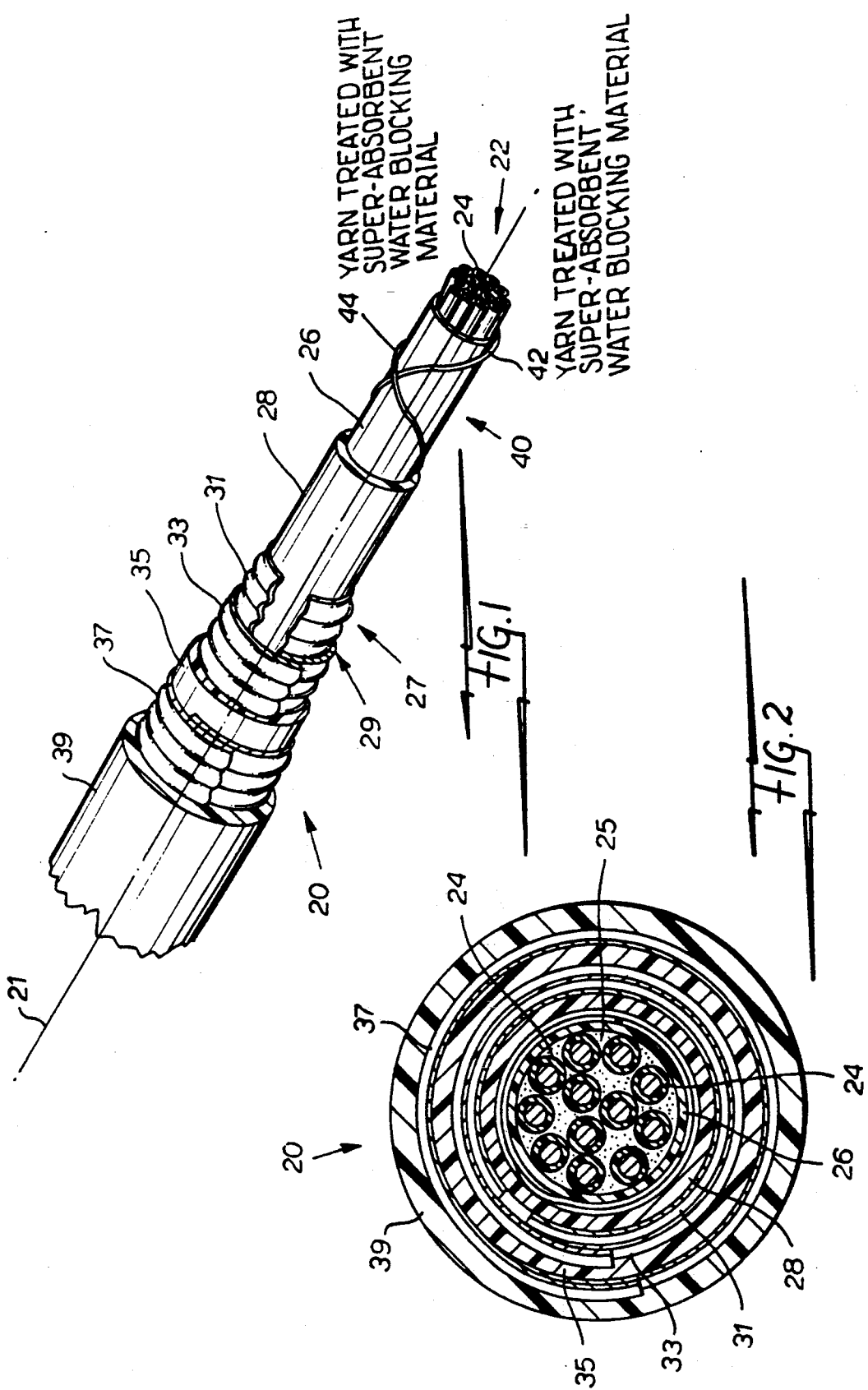

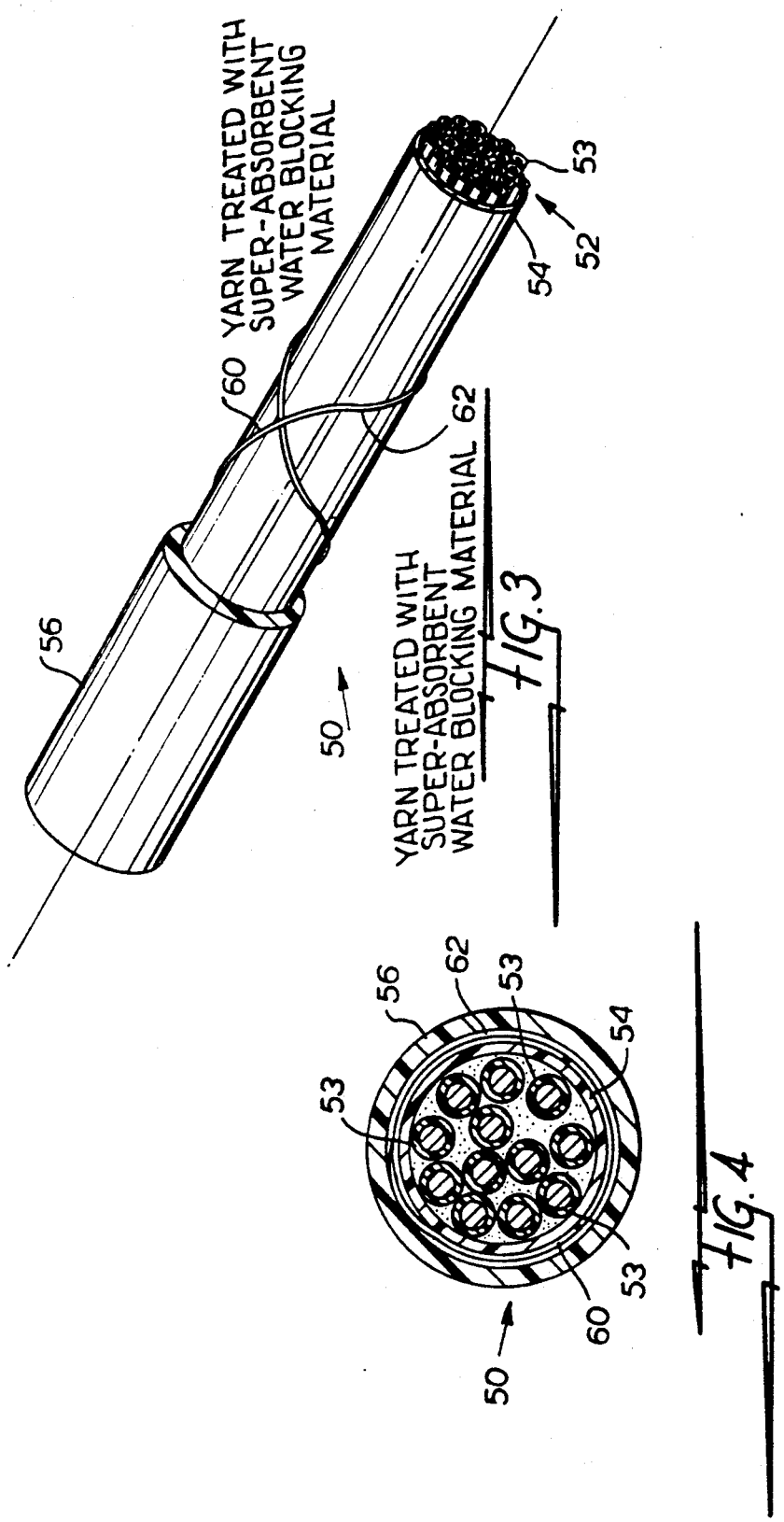

CABLE HAVING WATERBLOCKING PROVISIONS BETWEEN LAYERS OF RELATIVELY RIGID AND SUPPLE MATERIALS

TECHNICAL FIELD

This invention relates to a communications cable having waterblocking provisions between layers of relatively rigid and relatively supple materials. More particularly, it relates to a communications cable which includes facilities which are particularly useful in preventing the longitudinal migration of water along an interior portion of the cable between a relatively flexible material which has been wrapped about a core and an inner plastic jacket which is extruded about the core wrap material.

BACKGROUND OF THE INVENTION

In the cable industry, it is well known that changes in ambient conditions lead to differences in vapor pressure between the inside and the outside of a plastic cable jacket of a sheath system. This generally operates to diffuse moisture in a unidirectional manner from the outside of the cable to the inside of the cable. Eventually, this will lead to an undesirably high moisture level inside the cable, especially if a plastic jacket is the only barrier to the ingress of the moisture. High moisture levels inside a cable sheath system may have a detrimental effect on the transmission characteristics of the cable.

Furthermore, water may enter the cable because of damage to the sheath system which compromises the integrity of the cable. For example, lightning or mechanical impacts may cause openings in the sheath system of the cable to occur, allowing water to move toward a core of the cable, and, if not controlled, to move longitudinally into splice closures, for example. There are some splice closures available commercially in which the cable jacket is terminated inside the closure. Hence, if water is able to travel longitudinally along the cable, it could enter the splice closure, possibly causing a degradation in transmission.

In the prior art, various techniques have been used to prevent the ingress of water through the sheath system of a cable and into the core. For example, a metallic shield which often times is used to protect a cable against electromagnetic interference is provided with a sealed longitudinal seam. However, because lightning strikes may cause holes in the metallic shield, it is not uncommon to include additional provisions for preventing the movement of water longitudinally within the cable.

Filling materials have been used to fill cable cores and atactic or flooding materials have been used to coat portions of cable sheath systems to prevent the movement longitudinally thereof of any water which enters the cable. Although the use of a filling material causes housekeeping problems, inhibits manufacturing line speeds because of the need to fill carefully interstices of the core and presents problems for field personnel during splicing operations, for example, it continues to be used to prevent entry of the water into the core. In other arrangements, an atactic material, for example, may be used to flood the outer surface of a metallic shield.

Presently, many commercially available cables also include a water-swellable tape. The tape is used to prevent the travel of water through the sheath system and into the core as well as its travel longitudinally along the cable to closures and termination points, for example. Such a tape generally is laminated, including a water-swellable powder which is trapped between two cellulosic tissues. Further included may be a polyester scrim which is used to provide tensile strength for the laminated tape. Although such a tape provides suitable water protection for the cable, it is relatively expensive and thick. If the tape is too thick, the diameter of the cable is increased, thereby causing problems in terminating the cable with standard size hardware.

Another factor that must be considered with respect to a waterblocking system for a cable is the bonding of the plastic cable jacket to an underlying metallic shield. Where such adhesion is important to the performance of the cable, care must be taken not to interpose a waterblocking member therebetween which would impair the desired adhesion.

As a solution to the foregoing problems, a waterblocking member in the form of a strip or a yarn which covers only an insubstantial portion of an inner periphery of the cable may be used. In this way, the strip or the yarn separates only an insubstantial portion of the jacket from other portions of the sheath system. Hence, if adhesion between the jacket and the other portions of the sheath system is desired, that adhesion is not compromised by the waterblocking member. Further, such a strip or yarn is less expensive than one which covers substantially an entire inner periphery of the cable.

Further, the prior art discloses that a waterblocking member may extend linearly or helically along the cable. In an optical fiber cable in which separate strength members extend linearly within the cable, the strip or yarn may be wrapped helically about a core tube along an outer surface of which extend the strength members. In an optical fiber cable in which the strength members extend helically about the cable core, the yarn or strip extends linearly or is wrapped in a helical direction opposite to that of the strength members and is disposed between the strength members and the core. See U.S. Pat. No. 4,815,813 which issued on Mar. 28, 1989 in the names of C. J. Arroyo, H. P. Debban, Jr., and W. J. Paucke.

In the last mentioned optical fiber cable, water may travel along a helically or linearly extending channel formed along each helically or linearly extending strength member. The water is intercepted at each point at which a waterblocking yarn or strip crosses a strength member. However, in metallic conductor cables, strength is provided by the metallic conductors themselves and by metallic shields of the sheath system. In those instances, any water is not channeled along helically or linearly extending paths such as along the helically or linearly extending strength members in optical fiber cables, but rather can travel along an annularly shaped channel between adjacent components of the cable.

Another problem relates to a cable which includes an inner jacket which may be used to cover a plastic core wrap material such as Mylar ® plastic, for example. If a metallic shield is contiguous to the plastic core wrap material, the core wrap material may be flooded with an atactic material for waterblocking purposes. Here again such materials as atactic flooding compounds are not popular with craftspeople who at some future time may have to reenter the cable and be faced with housekeeping problems. On the other hand, if an inner jacket is interposed between the core wrap and the metallic shield, it becomes difficult to extrude a jacket having a uniform thickness over the flooding material. Furthermore, lumps could appear in the jacket, caused by uneven masses of the underlying flooding material.

Seemingly, the prior art does not disclose a cable which is provided with a system which prevents substantially the flow of water longitudinally along a cable sheath system which has no helically or linearly extending strength members and in which a plastic jacket is to be extruded directly over a relatively supple plastic core wrap. What is needed and what does not appear to be available in the marketplace is a cable waterblocking system which is relatively inexpensive and which does not add significantly to the diameter of the cable. Such a system should be one which is easily provided during the cable manufacturing process.

SUMMARY OF THE INVENTION

The foregoing problems of the prior art have been solved by cables of this invention. A cable of this invention includes a core which include at least one longitudinally extending transmission media and a layer of relatively supple plastic material which is disposed about the core. For a metallic conductor cable, the core may be filled with a suitable waterblocking material such as that disclosed, for example, in U.S. Pat. No. 4,870,117 which issued on Sep. 26, 1989 in the names of A. C. Levy and C. F. Tu. A relatively rigid plastic jacket is disposed about the layer of relatively flexible plastic material. In order to inhibit the flow of water longitudinally of the cable, two elongated strand waterblocking materials, such as yarns, are wrapped in opposite helical directions about the layer of relatively supple plastic material and are interposed between the layer of relatively flexible plastic material and the jacket. The plastic jacket may be an inner jacket with a shield system comprising one or more metallic shields and one or more additional plastic jackets disposed about the inner jacket.

BRIEF DESCRIPTION OF THE DRAWING

Other objects and features of the present invention will be more readily understood from the following detailed description of specific embodiments thereof when read in conjunction with the accompanying drawings, in which:

FIG. 1 is a perspective view of a communications cable having a sheath system which includes a waterblocking system with various layers of the sheath system broken away and some of the layers exaggerated in thickness for purposes of clarity;

FIG. 2 is an end sectional view of the cable of FIG. 1 which illustrates some elements of the cable in greater detail;

FIG. 3 is a perspective view of a cable which includes a core wrapped with a relatively supple plastic material, for example, and having yarns wrapped thereabout with a plastic jacket disposed about the yarns; and FIG. 4 is an end sectional view of the cable of FIG. 3.

DETAILED DESCRIPTION

Referring now to FIGS. 1 and 2, there is shown a communications cable which is designated generally by the numeral 20. The cable 20 has a longitudinal axis 21 and includes a core 22 comprising one or more transmission media such as one or more pairs of insulated metallic conductors 24-24 and is filled with a suitable waterblocking material 25. About the core is disposed a relatively flexible layer 26 of plastic material which often is referred to as a core wrap. Typically, the layer 26 typically comprises a strip of polyethylene terephthalate plastic material, for example, which has been wrapped about the core in a manner to form a longitudinally extending seam.

About the core wrap layer is disposed a sheath system 27 which includes a relatively rigid inner jacket 28 which is made of a plastic material and which encloses the core wrap and the insulated metallic conductors. Typically the inner jacket 28 is extruded over the core wrap layer 26 and comprises polyethylene.

A corrugated inner metallic shield system 29 is disposed about the inner jacket 28. As can be seen in FIGS. 1 and 2, the inner shield system 29 comprises a corrugated aluminum shield 31 which has been wrapped longitudinally about the core to form a gapped seam, which is exaggerated for purposes of clarity in FIG. 1, and a corrugated steel shield 33 which has a longitudinal overlapped seam.

An intermediate plastic jacket 35 is disposed about the corrugated steel shield. Typically, the intermediate jacket 35 comprises polyethylene plastic material.

The sheath system 27 also includes an outer corrugated steel shield 37 having a longitudinal overlapped seam and a plastic outer jacket 39. Typically, the outer plastic jacket 39 also comprises polyethylene plastic material.

In cables of this invention, additional provisions are made for preventing the flow of water longitudinally along the cable into closures. In the cable 20, water may travel within the cable between the core wrap layer 26 and the inner jacket. Between the core wrap layer 26 and the inner jacket 28 is disposed a water blocking system 40. Such water flow is prevented substantially by causing yarns which cover only an insubstantial portion of the periphery of the core wrap layer 26 to be disposed between the core wrap layer and the inner jacket 28.

The water blocking system 40 comprises yarns 42 and 44 (see FIG. 1), each of which includes a water-swellable material. The yarns 42 and 44, although identical in structure and composition, extend helically in opposite directions about the layer 26. The wrapping is such that about three turns of each yarn are included in each meter of cable length.

The yarn also must be characterized by suitable water absorbency and retentivity. In order to render the yarns 42 and 44 swellable upon contact with moisture, the yarn of the preferred embodiment is comprised of a plurality of fibers each of which has been treated chemically with a suitable water swellable material which herein is referred to as a superabsorbent material.

Superabsorbents are hydrophilic materials which can absorb and retain water under pressure without dissolution in the fluid being absorbed. See J. C. Djock and R. E. Klern "Review of Synthetic and Starch-Graft Copolymer Superabsorbents" prepared for the Absorbent Products Conference held Nov. 16–17, 1983 in San Antonio, Tex. and incorporated by reference hereinto. Properties such as enzyme stability, biodegradability, absorbent capacity and rate of uptake are used to characterize a superabsorbent material. One of the early superabsorbents was a saponified starch graft polyacrylonitrile copolymer. See U.S. Pat. No. 3,425,971. The above-identified patent disclosed saponifying starch-graft polyacrylonitrile copolymers with aqueous bases.

The two major superabsorbents which are available today are cellulosic or starch-graft copolymers and synthetic superabsorbents. There are two major broad classes of synthetic superabsorbents. These are the polyelectrolytes and the nonelectrolytes. The polyelectrolytes are the most important and fall into four classes-polyacrylic acid superabsorbents, polymaleic anhydride-vinyl monomer superabsorbents, polyacrylonitrile-based superabsorbents and polyvinyl alcohol superabsorbents. Of these, the polyacrylic acid and polyacrylonitrile-based superabsorbents are the most common. As with cellulosic-graft copolymer superabsorbents, the capacity of synthetic superabsorbents decreases with increasing salinity.

The polyacrylic acid class of superabsorbents includes both homopolymers and copolymers of acrylic acids and acrylate esters. The monomer units usually are polymerized to produce a water-soluble polymer which is then rendered insoluble by ionic and/or covalent cross-linking. Cross-linking of the polymer may be accomplished with a multivalent cation, radiation, or with a cross-linking agent. The absorbency of the product is determined by the number of ionizable groups, usually carboxylates, and the cross-linking density.

The cross-linking density affects not only the absorbency, but also the time it takes to absorb and the strength of the gel formed. Generally, the higher the cross-linking density, the stronger is the gel which is formed. The time to reach absorbent capacity decreases as the cross-linking density increases, and the absorbent capacity decreases.

The yarns 42 and 44 may be impregnated with any of several water blocking superabsorbent materials. They may be impregnated with a superabsorbent material which is derived from an aqueous solution comprising acrylate polymeric material which combines acrylic acid and sodium acrylate functionalities and water. The impregnating material may comprise a sodium salt of polyacrylic acid in which all the carboxylic groups may or may not be reacted with sodium. In other words, it is saponified in whole or in part. The level of saponification which may fall within a relatively wide range depends on desired properties. After the yarn has been impregnated, the superabsorbent material is dried to provide a film on the center fiber yarn.

In another embodiment, a yarn impregnated with an aqueous solution comprising acrylates and acrylamide polymer powders mixed with water. In each of the embodiments just described, the impregnating material is a mixture of water and a superabsorbent material in which the mixture comprises about 4 to 7% solids when the impregnating material is an aqueous solution and applied.

In general, the yarns 42 and 44 may be impregnated with (1) a material comprising polyacrylic acid, (2) a material comprising polyacrylamide (3) blends of (1) and (2) or salts thereof or (4) copolymers of acrylic acid and acrylamides and salts thereof as well as other similar superabsorbent materials.

In the preferred embodiment, each yarn 42 and 44 is comprised of treated fibers. Each treated fiber comprises an inner member which comprises about 70% by weight of the treated fiber and which comprises polyacrylonitril and an outer layer of superabsorbent material. In a preferred embodiment, the fibers of each yarn are 5 denier. The outer layer of superabsorbent material of the preferred embodiment comprises about 9% by weight of the treated fiber of polyacrylic acid and about 21% by weight of polyammonium acrylate. Such a yarn is disclosed in U.S. Pat. No. 4,366,206 which is incorporated by reference hereinto. Yarn suitable for use in a cable 20 is manufactured by Toyobo, Ltd. of Osaka, Japan, under the trade designation "Lanseal-F" superabsorbent fiber and is available commercially from Chori America, Inc. Treated 5 denier x 51 mm fibers which comprise a yarn of the preferred embodiment are characterized by a water absorbency in distilled water of 150 ml/g and in 0.9% NaCl solution of 50 ml/g. Water retentivity of such a fiber under weight for a 1% NaCl solution is 20 ml/g and its moisture content when shipped is no greater than 7%. Each fiber is characterized by a tensile strength (dry) of at least 1.6 g/d and an elongation (dry) of 15 to 25%. These properties appear in a bulletin entitled "Lanseal-F" superabsorbent fiber.

Each yarn 42 and 44 must be characterized by other properties. For example, because the yarn is to be embodied in a cable, it is beneficial for the yarn to have a relatively high tensile strength. For the preferred embodiment each yarn has a tensile strength of about 4.5 kg.

Advantageously, in response to contact with water, the superabsorbent material in a cable structure swells to block the flow of water in a longitudinal direction. When the yarn is contacted by water, the outer layer of each fiber swells significantly by imbibing water. The superabsorbent material also forms a gel and changes the viscosity of the ingressed water at the point of contact with the superabsorbent material, making it more viscous and consequently developing more resistance to water flow. As a result, the flow of water longitudinally along a cable from a point of entry is reduced substantially.

It will be recalled that unlike some optical fiber cables, the cable 20 does not include separate strength members which extend helically or longitudinally along the cable so that a single helically extending yarn intercepts water at crossover points with the strength members. In order to intercept water which may flow along a channel formed by any one yarn, the cable 20 of this invention includes two water blockable yarns. Further, as is seen in FIG. 1 the yarns 42 and 44 are wound helically in opposite directions about the core wrap layer 26.

The waterblocking system in any given plane transverse of the longitudinal axis 21 of the cable extends about only an insubstantial portion of an inner periphery of the cable in that plane. There is substantially no increase in the diameter of the cable because of the presence of the yarns 42 and 44. Also, the yarns 42 and 44 are substantially less in cost than a system in which a strip of waterblocking material or atactic flooding material is used.

The waterblocking system 40 of the cable of this invention facilitates the extrusion of the inner jacket 28. Inasmuch as the use of an atactic material between the core wrap layer 26 and the inner jacket 28 has been eliminated and replaced by helically extending yarns which occupy a relatively small portion of the circumference, the inner jacket is extruded over a relatively smooth surface. As a result, the inner jacket has a relatively uniform thickness and does not exhibit protruding portions.

Going now to FIGS. 3 and 4, there is shown a cable 50 which includes a core 52 which comprises one or more pairs of plastic insulated metallic conductors 53–53. The core 52 may be filled with a waterblocking material. A plastic core wrap layer 54 of a relatively flexible material has been wrapped about the core and a plastic jacket 56 which typically is comprised of polyethylene is disposed about the core wrap layer 54. Interposed between the core wrap layer 54 and the jacket 56 are two yarns 60 and 62 which extend in opposite helical directions about the core wrap layer. Each of the yarns may be identical to the yarns of the cable of FIG. 1 or may be comprised of other materials having suitable strength and waterblocking properties.

It is to be understood that the above-described arrangements are simply illustrative of the invention. Other arrangements may be devised by those skilled in the art which will embody the principles of the invention and fall within the spirit and scope thereof.

I claim:

1. A communications cable which comprises:
    a core having a longitudinal axis and comprising at least one transmission medium;
    a layer of a relatively supple plastic material which is disposed about said core;
    a relatively rigid jacket which comprises a plastic material, which is disposed about said layer of plastic material and which is characterized by a relatively uniform thickness; and
    first and second longitudinally extending strand-like waterblockable members which are disposed and wrapped helically in opposite directions in engagement with an outer surface of said layer of relatively supple plastic material and with an inner surface of said jacket.

2. The cable of claim 1, wherein each said waterblockable member comprises a yarn comprising fibers each of which has been treated with a waterswellable superabsorbent material.

3. The cable of claim 1, wherein said jacket is an inner jacket and said cable also includes
    a first metallic shield which is disposed about said inner jacket;
    a second metallic shield which is disposed about said first metallic shield;
    an intermediate jacket which comprises a plastic material and which is disposed about said second metallic shield;
    a third metallic shield which is disposed about said intermediate jacket; and
    an outer jacket which comprises a plastic material and which is disposed about said third metallic shield.

4. The cable of claim 2, wherein each of said yarns is comprised of fibrous material which comprises acrylic fibers which have been treated with a superabsorbent material.

5. The cable of claim 4, wherein each of the treated fibers includes a fiber portion comprised of polyacrylonitril.

6. The cable of claim 5, wherein each said fiber portion of each said treated fiber comprises about 70% by weight of said each treated fiber.

7. The cable of claim 6, wherein each of said fibers of each of said yarns has been provided with a superabsorbent material comprising about 9% by weight of said each treated fiber of polyacrylic acid and about 21% by weight of polyammonium acrylate.

8. The cable of claim 1, wherein each of said waterblocking members has been wrapped about said layer of relatively supple plastic material in a manner characterized by about three turns per meter of cable length.

* * * * *